United States Patent [19]

Strassheimer

[11] Patent Number: 4,950,514
[45] Date of Patent: * Aug. 21, 1990

[54] PLASTIC PREFORM FOR FORMING BLOW MOLDED PLASTIC BODIES

[75] Inventor: Herbert Strassheimer, Windermere, Fla.

[73] Assignee: Plasticon Patents, S. A., Geneva, Switzerland

[ * ] Notice: The portion of the term of this patent subsequent to Dec. 5, 2006 has been disclaimed.

[21] Appl. No.: 354,461

[22] Filed: May 23, 1989

Related U.S. Application Data

[63] Continuation-in-part of Ser. No. 262,781, Oct. 26, 1988, Pat. No. 4,885,197.

[51] Int. Cl.$^5$ .......................... B65D 1/02; B65D 23/00
[52] U.S. Cl. ................................ 428/36.92; 215/1 C; 220/70; 220/72; 220/83; 428/542.8
[58] Field of Search ..................... 428/36.92, 542.8; 215/1 C; 220/70, 72, 83

[56] References Cited

U.S. PATENT DOCUMENTS

| | | | |
|---|---|---|---|
| 4,334,627 | 6/1982 | Krisnakumar et al. | 215/1 C |
| 4,403,706 | 9/1983 | Mahajan | 428/542.8 |
| 4,725,464 | 2/1988 | Collette | 428/36.92 |
| 4,785,948 | 11/1988 | Strassheimer | 428/36.92 |

*Primary Examiner*—James Seidleck
*Attorney, Agent, or Firm*—Bachman & LaPointe

[57] ABSTRACT

A plastic preform for forming blow molded plastic containers wherein the inside wall face of the tubular body portion adjacent the bottom structure and extending onto the bottom structure has a plurality of faces with terminal portions thereof. Scallop-shaped segments are provided connecting the terminal portions of each face to initiate deformation prior to deformation of the faces and thereby have an increased rate and degree of orientation.

11 Claims, 4 Drawing Sheets

PLASTIC PREFORM FOR FORMING BLOW MOLDED PLASTIC BODIES

CROSS REFERENCE TO RELATED APPLICATION

The application is a Continuation-In-Part of U.S. Patent Application Serial No. 262,781, filed Oct. 26, 1988, now U.S. Pat. 4,883,197, issued Dec. 5, 1989.

BACKGROUND OF THE INVENTION

This invention relates to thermoplastic containers for the retention of fluids under pressure, such as carbonated beverages and the like. These containers may be prepared from a preform or parison which may be injection molded, followed by blow molding said parison into a suitably shaped container. A typical thermoplastic material is poly (ethylene terephthalate) or PET, although others can be used.

The container configuration generally includes a neck portion with a cap-receiving means, a shoulder portion depending therefrom, a side wall or main body portion depending from the shoulder portion and a bottom wall joined to the side wall. In many of these containers the bottom wall has a champagne bottle bottom configuration with an internal, axially inwardly directed, generally conical part.

The bottom wall of these containers represents a weak part of the container. Also, it is essential to provide a bottom shape capable of serving as a stable base support, since beverage under pressure within the container has a tendency to deform the bottom wall by inverting the inwardly directed conical part, thereby rendering the bottle unstable.

Many attempts have been made to overcome these problems while at the same time providing a construction which is inexpensive and economical to process. For example, U.S. Pat. No. 3,881,621 provides ribs to strengthen the bottom wall; however, this still provides insufficient reinforcement. U.S. Pat. No. 4,134,510 provides a plurality of concentric annular strengthening ribs and a plurality of additional intersecting radial ribs in a complex pattern which is expensive to produce. U.S. Pat. Nos. 4,620,639, 4,261,948, 4,603,831, and 4,334,627 utilize a plurality of inwardly projecting solid ribs so that the bottom wall is thicker at the ribbed portion than at the remainder of the bottom wall; however, this results in a container having substantial and sharply defined, sudden differences in wall thickness with resultant sharp differences in processing properties and in the properties of the finished base.

U.S. Pat. No. 4,785,948, by Herbert Strassheimer, teaches an improved plastic preform for forming blow molded plastic containers and the resultant improved plastic containers wherein the container has a tubular body portion adjacent a bottom portion and, extending onto the bottom portion, circumferentially spaced radially extending continuous alterations in wall thickness. The preform is characterized by the bottom structure thereof having a plurality of faces capable of forming, in the blow molded plastic bottle, a bottom portion having said circumferentially spaced radially extending continuous alterations in wall thickness with a regularly undulating cross section across the circumference thereof, wherein said alterations in wall thickness are progressive and gradual. The teaching of said U.S. Pat. No. 4,785,948 provides a stable and reinforced bottom wall configuration which is simple in construction and inexpensive to prepare and a preform which is similarly convenient and expeditious to prepare. However, it is desirable to further improve the characteristics of the said container, especially the bottom regions corresponding to the corners between the said faces of the preform. In large bottles, e.g., 2-liter and above, it is highly desirable, at times indeed necessary, to enhance the properties at this region by increasing local orientation.

It is therefore a principal object of the present invention to provide an improved plastic preform and an improved thermoplastic container prepared therefrom having a stable and reinforced bottom wall configuration.

It is a further object of the present invention to provide an improved preform and container as aforesaid which is simple in construction and inexpensive to prepare.

Further objects and advantages of the present invention will appear hereinbelow.

SUMMARY OF THE INVENTION

In accordance with the present invention it has now been found that the foregoing objects and advantages may be readily obtained. The preform or parison of the present invention is for forming blow molded plastic containers and comprises a neck portion defining an opening, a tubular body portion depending therefrom, and an integral bottom structure depending from the tubular body portion, said preform having an outside wall face and an inside wall face, with the inside wall face of the tubular body portion adjacent the bottom structure and extending onto the bottom structure having a plurality of faces with terminal portions thereof, scallop-shaped segments connecting the terminal portions of each face adapted to deform upon exposure to stresses prior to deformation of the faces and thereby become subject to an increased rate and degree of orientation. The faces may be flat or curved, and the terminal portions of each face connecting the scallop-shaped segments may be rounded to eliminate sharp corners.

In a preferred embodiment the faces form a polygonal configuration, e.g., hexagonal or octogonal, although other configurations may readily be employed such as for example obtained by replacing the flat faces of the polygon by curved faces. In addition, the wall thickness adjacent the bottom structure may be less than the wall thickness of the tubular body portion.

The present invention also provides an improved blow molded plastic container prepared from the aforesaid plastic preform by stretch-blow molding.

The construction of the preform and resultant container provides significant advantages, especially in the larger bottle diameters. Naturally, the larger the bottle diameter particularly at the base, the higher the tensile strength and creep resistance that are required of the material at the base. Considering for example any polygonal configuration, be it with flat or curved faces, the thick portions around the periphery of the preform which then form the thickened regions in the corresponding locations of the container, produce regions of sufficient strength due to their given degree of orientation as supported by the thickened wall. However, the bottle regions corresponding to the corners, i.e., intersects between the said faces may, depending on the size of the bottle, not have sufficient strength. In accordance with the present invention, the inventor herein provides scallop-shaped segments connecting the terminal portions of each face of the preform. With the temperature in the thickened and scallop-shaped segments the same at the time deformation is started, predictable and controlled deformation in blowing, particularly circumferential stretch, is initiated at the corner regions before deformation is initiated at the thickened portions. Correspondingly, the said scallop-shaped segments have an increased rate and degree of orientation compared to the thickened portions. Also, the deformation of the scallop-shaped segments will tend to occur at a lower temperature because the heat retention in the thinner section is smaller to begin with and the drop in temperature during deformation accelerates in keeping with the corresponding degree of thinning of the cross section. The resultant container is provided with continuous alterations in wall thickness with a regularly undulating cross section across the entire circumference of the inside wall face which is progressive and gradual, wherein said continuous alterations in wall thickness are provided on the tubular body portion adjacent the bottom portion and extending onto the bottom portion, the thinner portions of the continuous alterations in wall thickness extending in length due to the aforesaid provision of the scallops in the preform. It has been found that the overall strength of the bottom portion is increased especially at the thinner portions due to the increased rate and degree of orientation described hereinabove.

The foregoing features and advantages of the construction of the present invention and others will be discussed hereinbelow.

BRIEF DESCRIPTION OF THE DRAWINGS

The foregoing will be more readily apparent when considered in connection with the following illustrative examples wherein:

FIG. 2b is an alternate embodiment similar to FIG. 2a;

DETAILED DESCRIPTION

Figure 2A:
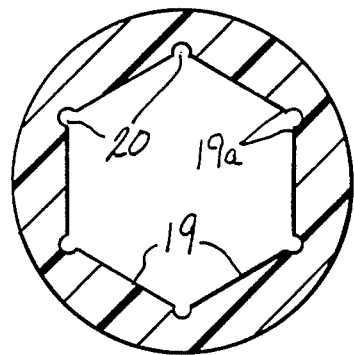
FIG. 2a is an enlarged sectional view along lines 2—2 of FIG. 1.

Referring now to the drawings in detail, a plastic parison or preform 10 is formed by injection molding from a synthetic resin which can be biaxially oriented, as for example poly (ethylene terephthalate). The preform 10 has a neck portion 11 defining an opening 12 and it may be provided with external threads 13 to serve as the site for attachment of a cap on the finished, blow molded plastic container. The preform 10 has a tubular body portion 14 depending from the neck portion 11 and an integral bottom structure 15 depending from the tubular body portion. The preform 10 has an outside wall face 16 and an inside wall face 17. The inside wall face 17 of the tubular body portion 14 is provided with a thickened portion 18 which extends onto bottom structure 15 and is characterized by a plurality of faces 19 with terminal portions thereof 19a. Scallop-shaped segments 20 connect the terminal portions of each face constituting weakened regions. Three or more of said faces may be used. The said faces may be flat as in FIGS. 2a and 2b, or curved as in FIGS. 7 and 8. For example, the hexagonal configuration of FIGS. 2a or the octagonal configuration of FIG. 2b may readily be employed. The bottom structure 15 as shown in FIG. 1 may be flat or may be provided with an axially inwardly directed conical part 21 as shown in FIG. 3.

Figure 2B:
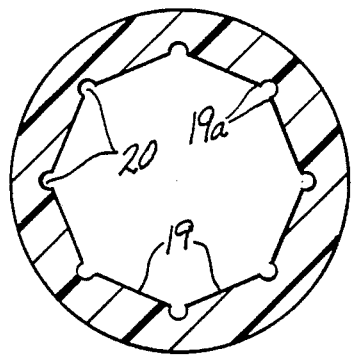
Figure 3:
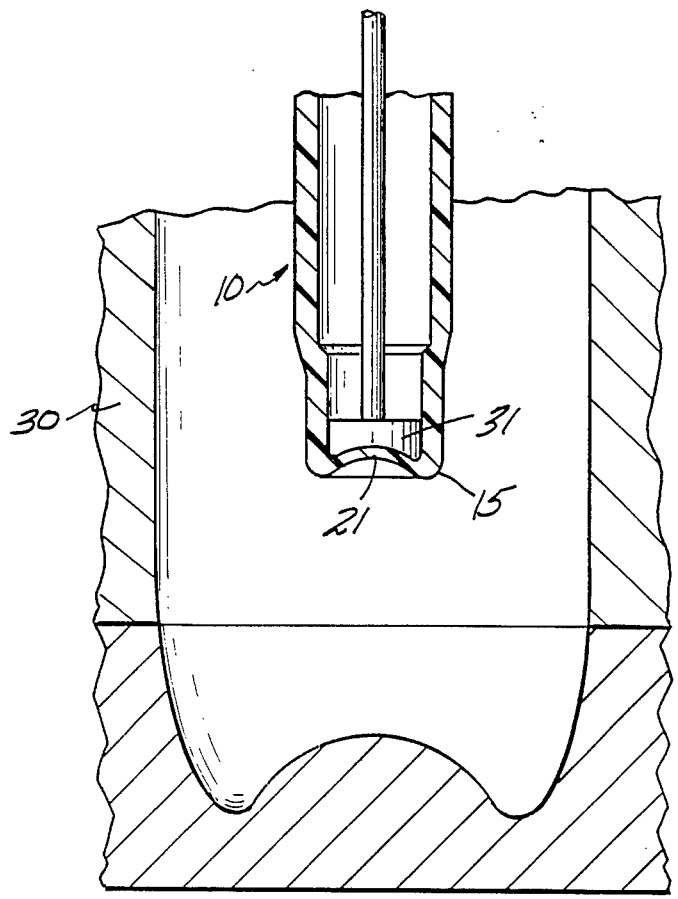
FIG. 3 is a partial sectional view taken through a mold for molding a container and having associated therewith a preform of the present invention similar to the preform of FIG. 1 which is to be stretched and blown therein to form a container of the present invention.
Figure 7:
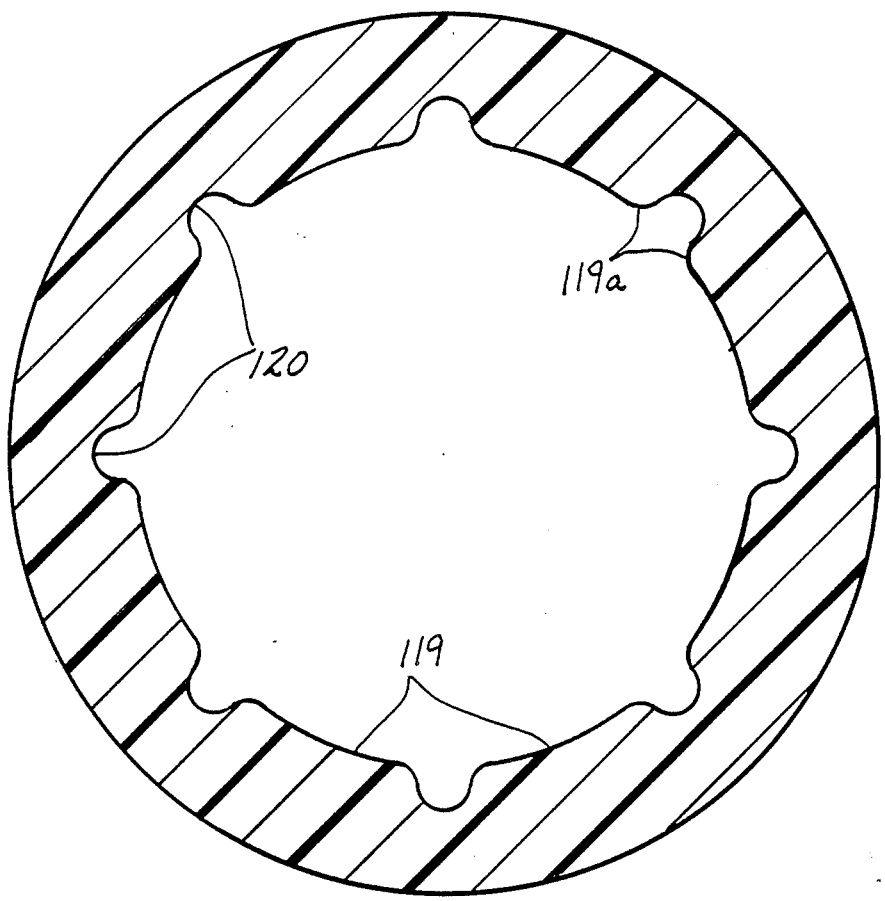
FIGS. 7 and 8 are enlarged sectional views of alternate embodiments similar to FIGS. 2a and 2b.
Figure 8:
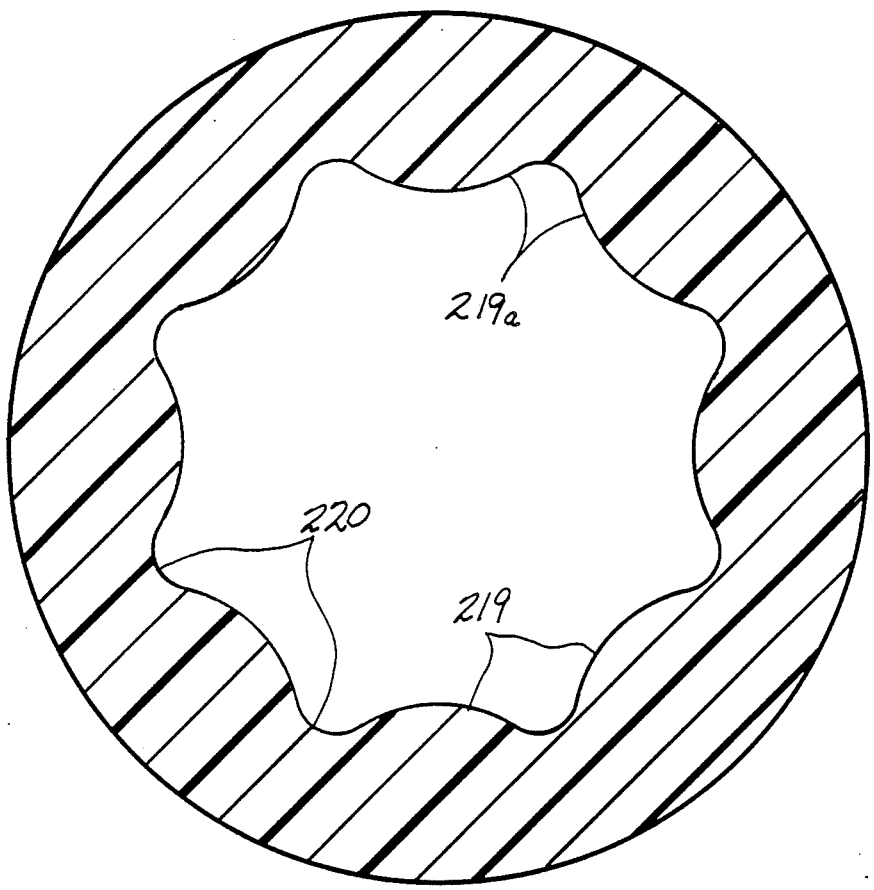

As shown in the alternate embodiment of FIG. 7, which is an enlarged sectional view similar to FIGS. 2a and 2b, faces 119 are concave curves with any reasonable curvature being suitable, while the alternate embodiment of FIG. 8 shows convex curves 219. Terminal portions 119a and 219a connecting scallop-shaped segments 120 and 220 are rounded to eliminate sharp corners and blend the scallop-shaped segments into the faces. The choice between the several available shapes of the faces, as a rule, depends on how gradual the transition from thicker to thinner regions of the base is to be for a given size and bottle configuration.

Figure 1:
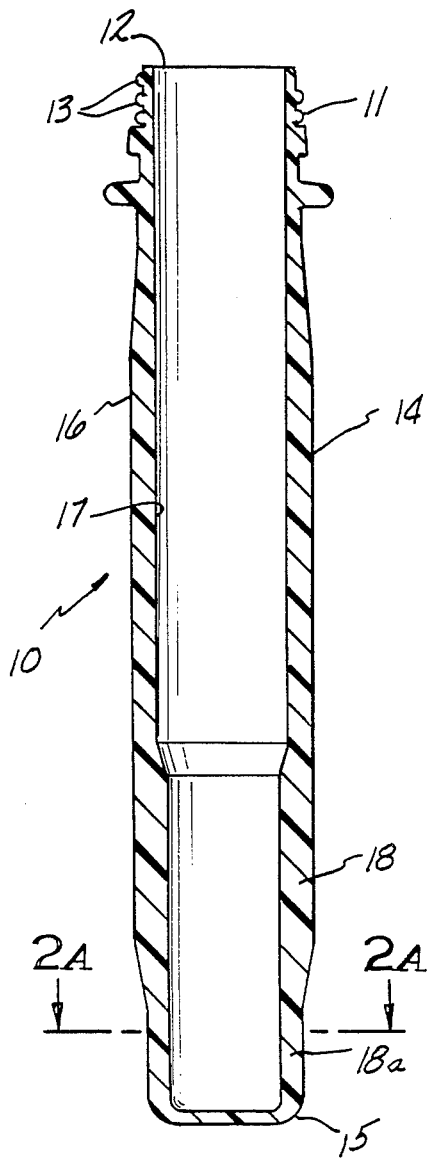
FIG. 1 is a sectional view of a preform of the present invention.

As shown in FIG. 1, thickened portion 18 includes a lower portion 18a adjacent the bottom structure having a wall thickness less than the wall thickness of the adjacent thickened portion 18. It has been found in accordance with the present invention that this may be employed in order to save material costs without loss of necessary properties in view of the significant advantages obtained in accordance with the present invention. Alternately, if desired, external ribs may be provided on the preform as disclosed in U.S. Pat. No. 4,785,948.

Figure 4:
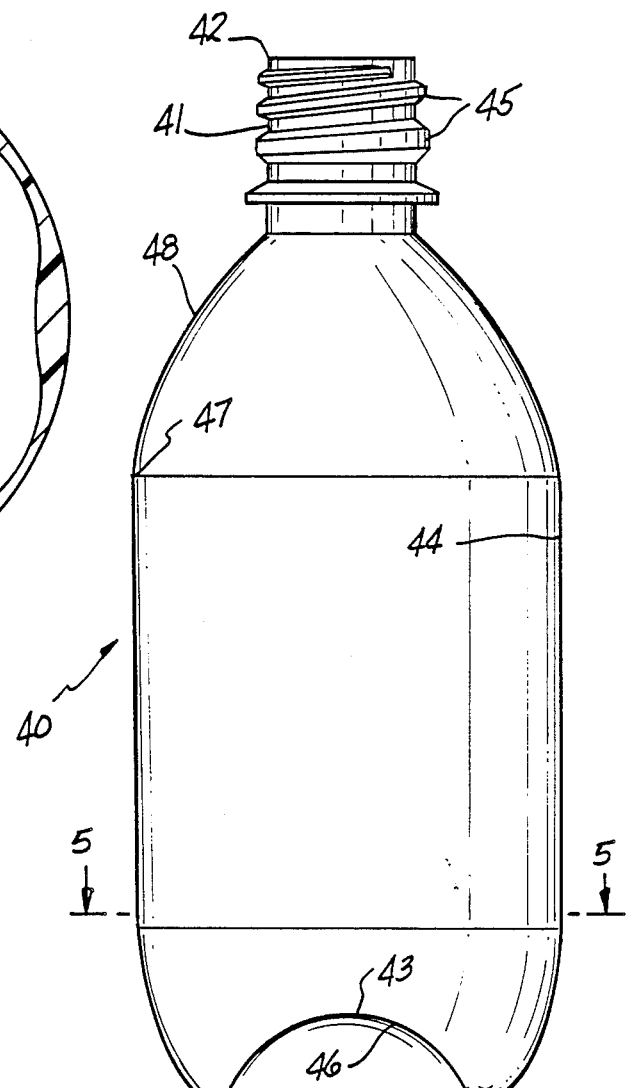
FIG. 4 is an elevational view of a container formed in FIG. 3.
Figure 6:
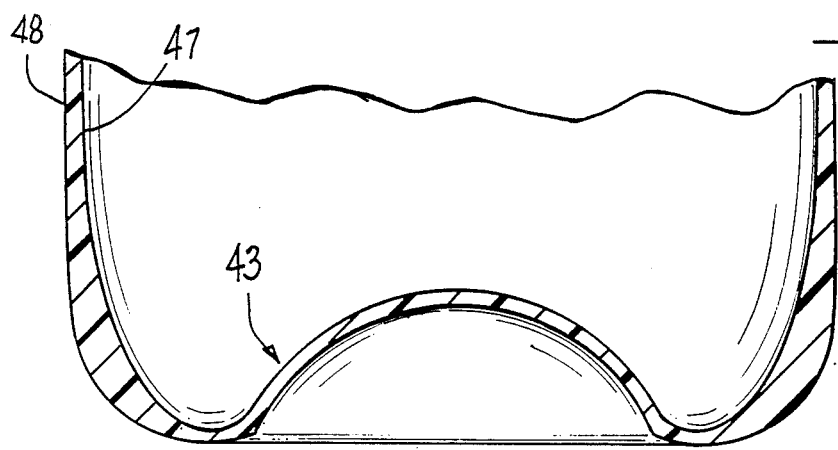
FIG. 6 is a partial, enlarged sectional view of the bottom portion and adjacent tubular body portion of the container of FIG. 4.

The thus formed preform is brought to a temperature at which blow molding can be accomplished which may be done by heating a previously formed preform or forming the hot preform in line with the blow molding operation and suitably adjusting the temperature thereof. The heated preform is then placed in a blow mold having the configuration of the desired container as blow mold 30 shown in FIG. 3 and while blowing compressed air thereinto, the interior side of bottom portion 15 is pushed down by movable means 31 to effect biaxial orientation. The particular blow mold 30 shown in FIG. 3 has an internal configuration which allows the formation of a plastic container 40 (see FIG. 4) having a desired configuration.

It is particularly preferred in accordance with the present invention to provide stretching of the bottom region and of the tubular body portion in different amounts, to impart at least to the said bottom region continuous variations of thickness, the thick parts thereof on average being thicker than the average body wall thickness of the container body portion. A method using a stretch rod having a thickened distal end is fully disclosed in copending application SN 142,004, filed Jan. 11, 1988, now U.S. Pat. No. 4,880,593, issued Nov. 14, 1989, the disclosure of which is hereby incorporated by reference.

Thus, blow molded plastic container 40 is formed having a neck portion 41 defining an opening 42, a bottom portion 43, a tubular body portion 44 interconnecting the neck portion 41 and the bottom portion 43. Neck portion 41 is provided with external threads 45 to serve as the site for attachment of a cap on the container, as with preform 10. The bottom portion 43 has an internal, axially inwardly directed generally conical part 46.

Figure 5:
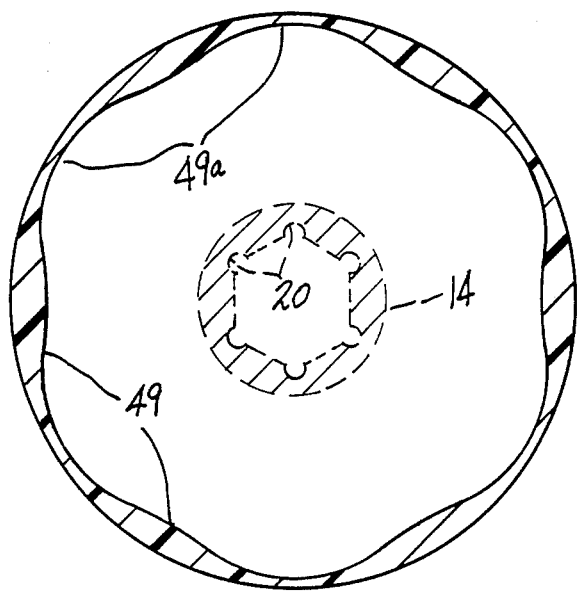
FIG. 5 is an enlarged sectional view taken along lines 5—5 of FIG. 4, with the corresponding sectional view of FIG. 2 superimposed therein in phantom.

FIG. 5 shows an embodiment of the present invention wherein the faces form a hexagonal configuration. Scallop-shaped, curved, segments 20 form the thinner portions 49a of the regularly undulating cross-sectional configuration of the bottom portion of the container with 49 representing the thicker portions. Said segments may constitute parts of circles, to facilitate manufacture.

The process underlying the above-described result progresses as follows. Given a uniform cross-sectional distribution of temperature, the scallop-shaped portions initiate deformation at the intersects of the flat or curved faces, because the thicker portions resist the deforming forces more than the thinner ones. As the originally scallop-shaped portions thus become deformed, their surface area increases while their thickness diminishes. Consequently, they lose heat, i.e., they cool, until they offer the same resistance to deformation, or less, as the thicker, warmer portions. By then, the originally scallop-shaped portions will have acquired substantial orientation in deforming. At that time both the thinner and thicker portions will deform together briefly and thereafter deformation will occur substantially in the thicker portions altogether, to the effect that the latter will become oriented, approximately the same as the thinner portions. Movement continues until all portions reach the wall of blow mold 30. At that time, all bottom parts of the finished bottle are oriented, i.e., the thinner and thicker portions, 49a and 49, respectively in FIG. 5.

It is noted that without the scallops 20, initiation of the deformation at the intersects of the faces is not guaranteed. It may instead occur randomly, away from that location, resulting in insufficient deformation of said intersects. In other words, it is necessary to weaken the region in which deformation is to commence more than the geometry of the face-intersects can naturally provide.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A plastic preform for forming blow molded plastic bottles which comprises: a neck portion defining an opening; a tubular body portion depending therefrom; and an integral bottom structure depending from the tubular body portion wherein said tubular body portion includes a lower portion with a thickened portion in said lower portion; said preform having an outside wall face and an inside wall face with the inside wall face of the tubular body portion adjacent the bottom structure and extending onto said bottom structure having a plurality of faces with terminal portions thereof; and scallop-shaped segments connecting the terminal portions of each face adapted to deform upon exposure to stresses prior to deformation of the faces and thereby become subject to an increased rate and degree of orientation.

2. A preform according to claim 1 wherein said faces are in the form of a polygon.

3. A preform according to claim 1 wherein said faces are curved inwardly by reference to said inside wall.

4. A preform according to claim 1 wherein said faces are curved outwardly by reference to said inside wall.

5. A preform according to claim 1 wherein the wall thickness of the tubular body portion adjacent the bottom structure is less than the wall thickness of the adjacent thickened tubular body portion.

6. A preform according to claim 1 which is injection molded.

7. A preform according to claim 1 including an axially inwardly directed conical part on said bottom structure.

8. A preform according to claim 1 wherein each of said segments constitutes a segment of a continuous curve.

9. A preform according to claim 8, wherein said curve is a conic section.

10. A preform according to claim 8 wherein said curve is blended into an adjoining face.

11. A blow molded plastic container prepared from the preform of claim 1 by stretch blow molding.

* * * * *